United States Patent [19]

Ogasawara et al.

[11] 3,888,938

[45] June 10, 1975

[54] PROCESS FOR OBTAINING 2,6-DIMETHYLNAPHTHALENE-RICH OR 2,7-DIMETHYLNAPHTHALENE-RICH PRODUCT

[75] Inventors: Makoto Ogasawara; Kazuyoshi Suzuki; Takanori Urasaki; Takeo Shima; Shizuka Kurisu; Yasuji Hirabayashi, all of Iwakuni, Japan

[73] Assignee: Teijin Limited, Osaka, Japan

[22] Filed: May 22, 1974

[21] Appl. No.: 472,440

[30] Foreign Application Priority Data
May 26, 1973 Japan.............................. 48-58236
June 5, 1973 Japan.............................. 48-62503

[52] U.S. Cl............................ 260/668 A; 260/668 F
[51] Int. Cl........................... C07c 5/24; C07c 15/24
[58] Field of Search................................ 260/668 A

[56] References Cited
UNITED STATES PATENTS
3,377,400  4/1968  Wise.............................. 260/668 A
3,806,552  4/1974  Oka et al......................... 260/668 A Primary Examiner—Veronica O'Keefe
Attorney, Agent, or Firm—Sherman and Shalloway

[57] ABSTRACT

Improved process for obtaining a 2,6-dimethylnaphthalene-rich or 2,7-dimethylnaphthalene-rich product which comprises the liquid phase catalytic intramolecular rearrangement of dimethylnaphthalenes in the presence of a mixed catalyst consisting of
a. 70–95% by weight of a hydrogen form of mordenite in which above 80% by weight of the metal cations are replaced with hydrogen ions, and
b. 30–5% by weight of a promoter selected from the group consisting of bentonite and fuller's earth.

4 Claims, No Drawings

3,888,938

PROCESS FOR OBTAINING 2,6-DIMETHYLNAPHTHALENE-RICH OR 2,7-DIMETHYLNAPHTHALENE-RICH PRODUCT

This invention relates to an improved process for obtaining a 2,6-dimethylnaphthalene-rich or 2,7-dimethylnaphthalene-rich product by carrying out the liquid phase catalytic intramolecular rearrangement, respectively, of the dimethylnaphthalenes consisting of the 2,6-dimethylnaphthalene family or the 2,7-dimethylnaphthalene family, whose content of the 2,6-dimethylnaphthalene or the 2,7-dimethylnaphthalene is less than its thermodynamic equilibrium concentration, wherein said rearrangement reaction is carried out at a temperature from 260° to 500° C. in the presence of a mixed catalyst consisting of the hydrogen form of mordenite and a promoter selected from the group consisting of bentonite and fuller's earth.

A group of inventors inclusive of a part of the inventors of this invention previously suggested a process for obtaining a 2,6-dimethylnaphthalene-rich product by carrying out the gaseous phase catalytic intramolecular rearrangement of dimethylnaphthalene consisting of the 2,6-dimethylnaphthalene family whose content of the 2,6-dimethylnaphthalene is less than its thermodynamic equilibrium concentration by using a mixed catalyst consisting of a. 65–95 % by weight of a hydrogen form of mordenite in which above 80 % by weight of the metal cations are replaced with hydrogen ions, and
b. 35–5% by weight of a promoter selected from the group consisting of bentonite and fuller's earth (U.S. patent appln. Ser. No. 310,011, now U.S. Pat. No. 3,806,552).

In the above-mentioned prior application the reaction is carried out in the presence of a carrier gas, i.e., in the gaseous phase. Hence, there is the disadvantage that equipment and operations for gasifying the starting dimethylnaphthalene are required. In addition, there is also the disadvantage that heat is required for carrying out the foregoing gasification operation. With a view to avoiding the foregoing disadvantages of the gaseous phase reaction, we researched into the possibility of carrying out the foregoing reaction in the liquid phase. As a result, we found that a mixed catalyst practically duplicating that used in the foregoing gaseous phase reaction could be used in the liquid phase reaction. That is, there could be used in the liquid phase reaction a mixed catalyst consisting of a. 70–95 % by weight of a hydrogen form of mordenite in which above 80 % by weight of the metal cations are replaced with hydrogen ions, and
b. 30–5% by weight of a promoter selected from the group consisting of bentonite and fuller's earth.

Again, it was found that not only are the disadvantages of the gaseous phase reaction overcome by carrying out the reaction in the liquid phase, but also the hereinafter defined selectivity (S value) is enhanced. That is, notwithstanding the fact that it is an isomerization reaction at a temperature higher than that of the conventional methods, only the intended isomerization reaction takes place without the accompaniment of hardly any disproportionation reaction. It was indeed surprising that other advantages in addition to the obvious merits ascribable to the employment of the liquid phase could be attained.

British Patent Specification No. 1,039,246 discloses a process for the catalytic intra- and/or intermolecular rearrangement of the alkyl groups present in the alkylaromatic hydrocarbons, which comprises contacting a $C_7 - C_{15}$ alkylaromatic hydrocarbon with hydrogen mordenite at a temperature between 200° and 600° C. It is proposed therein that a sodium form of mordenite commercially available as ZEOLON from the Norton Company (U.S.A.) should be converted to the hydrogen form, and that the mordenite so formed, in which the hydrogen form accounts for at least 95 % by weight, should be used.

Furthermore, in this patent there are given examples indicating that a metal selected from the group I-B, VI-B and iron group metals of group VIII can be added to the mordenite catalyst by the ion-exchange or impregnation method, in an amount of from 0.01 to 20 % by weight, and specifically, that a maximum of 5 % by weight of Ag and a maximum of 3 % by weight of Ni were incorporated in the hydrogen mordenite.

This British Patent specification also discloses that for obtaining desirable results the rearrangement reaction should be carried out under such pressure conditions of a total pressure of 7 to 140 atm., and especially from 35 to 70 atm.

But, in this specification there is no specific description as regards the catalytic rearrangement reaction of dimethylnaphthalenes, the liquid phase reaction and such promoters as bentonite and fuller's earth. This process is further beset with side reactions such as demethylation, and its isomerization selectivity is poor such as to result in exceedingly low isomerization yields. As hereinafter shown in the comparative examples, the improvements of the present invention cannot be achieved by the omission of the promoter in the invention process or by using the promoter in an amount without the range specified by the invention.

Further, British Patent Specification No. 1,143,913 (corresponding U.S. Pat. No. 3,377,400) discloses a liquid phase process for the catalytic isomerization and/or disproportionation of the alkyl aromatics. In this specification there is mentioned the use as catalysts of the crystalline aluminosilicates, e.g., the naturally occurring zeolites such as mordenite and faujasite and the synthetized materials such as mordenite and zeolites X, Y, and beta. The crystalline aluminosilicates are characterized by high catalytic activity imparted thereto by base exchanging the alkali metal form with a base exchange solution to replace all or at least a substantial portion of the original alkali metal ions with other cations, such as, cations of Ca, Mg, Mn, Cr, Al, Zr, V, Ni, Co, Fe, rare earth metals, and hydrogen ions. According to this British patent specification, the liquid phase reaction is carried out at below 600°F. (about 316°C.). It especially states that the isomerization reaction is to be carried out at a temperature of 300° F. (about 148.9° C.) – 500° F. (260° C.), whereas the disportionation reaction is to be carried out at a higher temperature. In other words, it states that a temperature above 260° C. is not suitable for carrying out the isomerization reaction. Further, no mention is made of the use of bentonite or fuller's earth as a promoter in this British patent. Nor is there any specific description as regards the catalytic rearrangement reaction of dimethylnaphthalenes in this patent. As shown by the hereinafter given comparative examples, inferior results are demonstrated by the use of temperatures lower than 260°C., and the results obtained are especially poor in the case where the mordenite catalyst used is one in which bentonite and/or fuller's earth, the promoter, has been omitted.

It is therefore an object of the present invention to provide an improved process for obtaining a 2,6-dimethylnaphthalene-rich or 2,7-dimethylnaphthalene-rich product by carrying out the liquid phase catalytic intramolecular rearrangement, respectively, of the 2,6-dimethylnaphthalene family or the 2,7-dimethylnaphthalene family whose content of the 2,6- or the 2,7-dimethylnaphthalene is less than its thermodynamic equilibrium concentration.

Other objects and advantages of the present invention will become apparent from the following description.

One of the starting dimethylnaphthalenes to be used in this invention is the dimethylnaphthalene consisting of or including the 2,6-dimethylnaphthalene family of the following formula in which the content of 2,6-dimethylnaphthalene is below its dynamic equilibrium concentration.

2,6-DMN ⇌ 1,6-DMN ⇌ 1,5-DMN wherein DMN stands for dimethylnaphthalene (to be applied equally hereinafter). The other starting dimethylnaphthalene to be used in this invention is the dimethylnaphthalene consisting of or including the 2,7-dimethylnaphthalene family of the following formula in which the content of 2,7-dimethylnaphthalene is below its dynamic equilibrium concentration.

1,7-DMN ⇌ 1,8-DMN ⇌ 2,7-DMN

In the present invention the starting dimethylnaphthalene material used is one whose content of trimethylnaphthalene does not exceed 10 mol%, preferably not exceed 3 mol%, and in which the 2,6-dimethylnaphthalene family or the 2,7-dimethylnaphthalene family is contained in an amount of at least 60 % by weight, preferably at least 75 % by weight, and still more preferably at least 85 % by weight.

For instance, one of the starting dimethylnaphthalene materials is one containing 2,6-DMN, 1,6-DMN or 1,5-DMN, and mixtures of two or three classes of these dimethylnaphthalenes, and in which the content of 2,6-DMN is beloow the thermodynamic equilibrium concentration of 2,6-DMN, and the other optional isomers account for not more than 40 % by weight, preferably not more than 25 % by weight, and still more preferably not more than 20 % or 15 % by weight, especially 10 % by weight, of the starting material. The use of the starting dimethylnaphthalene material until the content of trimethylnaphthalene exceeds 10 mol% must be avoided, since this will result in the formation of the by-product 2,7-dimethylnaphthalene in an amount that cannot be ignored.

The other starting dimethylnaphthalene material is one containing 2,7-DMN, 1,8-DMN or 1,7-DMN, and mixtures of two or three classes of these dimethylnaphthalenes, and in which the content of 2,7-DMN is below the thermodynamic equilibrium concentration of 2,7-DMN, and the other optional isomers account for not more than 40 % by weight, preferably not more than 25 % by weight, still more preferably not more than 20 % or 15 % by weight and especially 10 % by weight, of the starting material. The use of the starting dimethylnaphthalene material until the content of trimethylnaphthalene exceeds 10 mol% must be avoided, since this will result in the formation of the by-product 2,6-dimethylnaphthalene in an amount that cannot be ignored.

In the case of the former starting material, difficulty is experienced in separating the by-product 2,7-DMN from the mixed system of 2,6-DMN and 2,7-DMN, while in the case of the latter starting material, difficulty is likewise experienced in separating the by-product 2,6-DMN. Hence, in both cases the admixture in the starting material of trimethylnaphthalene in excess of 10 mol% must be avoided.

In the invention process the mixed catalyst system consisting of the following components (a) and (b) is used.

a. a hydrogen form of mordenite in which above 80 % by weight of the metal cations are replaced with hydrogen ions, and b. a promoter selected from the group consisting of bentonite and fuller's earth.

In this mixed catalyst, the two components are mixed in a proportion of about 70 % – about 95 % of the component (a) and about 30 – 5 % of the component (b). The intended improvement of the invention is best demonstrated, when component (a) is contained in about 70 % – about 90 % in said mixed catalyst.

As for said mordenite, it preferably should have an effective pore diameter of 7 – 11 A. This mordenite catalyst possesses great resistance to acids and can be replaced with hydrogen even though it is directly treated with acids. This mordenite catalyst can be obtained usually either by exchanging a sodium-substituted product with ammonium ions followed by calcination to obtain the hydrogen-substituted form or by treating the commercially available sodium-substituted product with a mineral acid. Aside from these, the hydrogen form of mordenite in which above 80 % by weight of the metal cations are replaced with hydrogen ions, which have been obtained by any of the other known methods, can also be used. As the other metals that the foregoing mordenite catalyst can contain in an amount up to 20 % by weight, mention can be made of such metals as Li, Na, K, Mg, Be, Ca, Sr, Ba, Zn, Al, Cu, Ag, Cr, Mo, Fe, Co, and Ni.

The following are used as promoters in the mixed catalyst of the present invention.

a. Bentonite.

This clay consists essentially of montmorillonite or beidelite. Its suspension is weakly alkaline, such as pH 7.5–8.5. Some swell remarkably in water (to above five times their original volume).

b. Fuller's earth.

This, too, consists essentially of montmorillonite or beidelite. Its suspension is neutral or weakly acidic, such as ph 5–7. This includes Japanese acid clay.

The activity of these clays can be modified by treatment with $H_2SO_4$ or HCl or the like at a temperature between room temperature and their boiling point. By such treatment, these clays are made more active, less active, or remain almost unchanged in activity. Highly active clays are not always used in the present reaction.

If the activity is too high, side reactions other than intramolecular rearrangement tend to occur, and in such a case a suitable acid treatment can be made use of to adjust the activity.

The bentonite and fuller's earth used in the present invention are commercially available, and although the commercial products may be used without modification, it is preferable to use them after treatment with acids.

Namely, preferred is the hydrogen form of bentonite or fuller's earth in which more than 30 % by weight, preferably 85 % by weight, of the metal cations are replaced with hydrogen ions. Needless to say, the metal form of bentonite or fuller's earth in which more than 70 % by weight are metal cations can also be used. As the metal cations of this metal form of bentonite or fuller's earth, mention can be made of such, for example, as the cations of Na, K, Mg, Ca, Sr, Ba, Al, Ti, Zr, Cr, Mo, Mn, Re, Co, Ni, Pd, Zn and Cd. Of these, preferred are the metal cations of Na, K, Ca, Sr, Mg, Al, Zn and Cd.

The suitability of mixing the hydrogen form of mordenite (a) and the promoter (b) in the proportions hereinbefore indicated herein can be seen by reference to the hereinafter given comparative examples in which the proportion of mix is without the preferred range. It is seen that the intended improvement of the invention cannot be achieved in respect of one or more points such as conversion, selectivity, catalyst life and the rate of formation of the by-product DMN when the proportion of mixed catalyst is not within the specified range.

The mixed catalyst composition used in the present invention may be supported on a carrier such as alumina, silica, silica-alumina or titanium oxide. Also, it may support a noble metal such as platinum or palladium.

The isomerization reaction of the present invention may be carried out by using a fixed bed or fluidized type bed reaction apparatus, but preferred is the use of a fixed bed type reaction apparatus from the viewpoint of the operation of the reaction.

A reaction temperature ranging from 260° to 500° C., preferably 280° to 430° C., and more preferably 320° to 400° C., is used in the present invention. When a low temperature of below 260° C. is used in the liquid phase reaction of this invention, the isomerization reaction is greatly retarded, and it is undesirable, since not only the efficiency drops, but also the hereinafter defined P value becomes small.

On the other hand, when the reaction temperature exceeds 500° C., the disproportionation reaction becomes exceedingly active, and not only the hereinafter defined S value becomes small, but both the catalyst life and P value are reduced as well, thus making it difficult to obtain the intended dimethylnaphthalene at high efficiency and good yield.

The invention process can be carried out either batchwise or continuously. When the process is carried out batchwise, the aforementioned mixed catalyst is added in an amount of at least 0.1 % by weight, and preferably 1–50 % by weight, based on the starting DMN, following which the catalytic reaction may be carried out, say, for 0.1–10 hours at a temperature of 260°–500° C. On the other hand, when the process is to be carried out continuously, usable is a procedure of feeding the starting DMN at the rate of 0.1–50 parts by weight, and preferably 0.5–25 parts by weight, per hour per unit part by weight of the catalyst.

As the catalytic intramolecular rearrangement reaction of this invention is carried out in the liquid phase at a temperature ranging from 260° to 500° C., the reaction is carrieed out, as required, under superatmospheric conditions necessary for maintaining the reaction system in the liquid phase. The pressure used is usually one ranging between 1.0 atmosphere and 100 atmospheres.

Any substance which is inert to the reactants under the reaction conditions may be used as a diluent or a sealing gas, and for example, an inert gas such as nitrogen, carbon dioxide, water vapour and hydrogen, or an aliphatic, alicyclic or aromatic hydrocarbon having 1 – 10 carbon atoms such as methane, ethane, propane, n-hexane, cyclohexane, or benzene may be used. The diluent is used in an amount of not more than one-half mol per mol of the dimethylnaphthalene.

As regards the reaction operation, the starting dimethylnaphthalene can be introduced into the isomerization reaction zone containing the mixed catalyst of the present invention, at which zone the reaction is carried out at a temperature of 260° – 500° C. It is preferred in operating the reaction to combine the first step of isomerizing the starting dimethylnaphthalene and the second step of separating the 2,6-DMN or 2,7-DMN from the isomerization reaction product, followed by recycling to the first step for reuse the dimethylnaphthalene remaining after separation of the 2,6-DMN and 2,7-DMN in the second step. At this time the dimethylnaphthalene to be recycled for reuse may be recycled as such or after mixing with the starting dimethylnaphthalene used in the first step.

By repeating the recycle operation, trimethylnaphthalene can be accumulated in the recycle system, thus increasing its content.

In practising the process of the present invention, it is preferred that the trimethylnaphthalene content of the dimethylnaphthalenes in the isomerization reaction zone be controlled so as to be not more than 10 mol%. While the reason is not known, it has been recognized that dimethylnaphthalenes controlled so as to have a trimethylnaphthalene content of less than 10 mol%, preferably less than 5 mol%, tend to cause the intramolecular rearrangement to take place alone in the isomerization reaction, and that the selectivity is worsened if trimethylnaphthalenes of an amount over 10 mol% are subjected to isomerization reaction conditions.

Accordingly, in the embodiment of the present invention where the desired isomerization product is separated from a flow of the resultant isomerization product and the remainder is recycled to the isomerization reaction zone for reuse, it is preferred to remove the trimethylnaphthalene accumulated in the system at a suitable step and control the trimethylnaphthalene content of the isomeriztion reaction zone to below 10 mol%, and preferably below 5 mol%.

In the process of the present invention, the removal of trimethylnaphthalene from dimethylnaphthalenes can be readily carried out by means of distillation, and this removal may be done prior to the separation of the intended 2,6-DMN or 2,7-DMN from the isomerization reaction product, or after this separation and prior to recycling of the remainder to the isomerization reaction zone. Of the two means, the former is more preferable since it gives a product of higher purity.

The separation of the intended 2,6-DMN from the liquid phase isomerization reaction product of dimethylnaphthalene consisting of the 2,6-DMN family whose content of the 2,6-DMN is less than its thermodynamic equilibrium concentration or the separation of the intended 2,7-DMN from the liquid phase isomerization reaction product of dimethylnaphthalene consisting of the 2,7-DMN family whose content of the 2,7-DMN is less than its thermodynamic equilibrium concentration can easily be carried out by cooling the isomerization reaction product to a proper temperature and separating the precipitated crystals, or by adding a suitable solvent to the isomerization reaction product, cooling the solution and separating the precipitated crystals. As suitable solvents, alcohols such as methanol, ethanol, propanol, isopropanol, butyl alcohol and hexyl alcohol; aliphatic and alicyclic hydrocarbons such as n-pentane, isopentane, n-hexane, isohexane, cyclohexane, methylcyclohexane, n-heptane, 3-methylpentane, n-octane, isooctane, 3,3-dimethylhexane, 2,3-dimethylhexane and 3-ethylhexane; and aromatic hydrocarbons such as benzene, toluene, xylene and ethylbenzene can be mentioned.

The catalyst which has been used in the isomerization reaction of the present invention can be regenerated for reuse by calcining it in an atmosphere of nitrogen containing 0.5 – 20 % of oxygen at a temperature of 450° – 600° C.

The process of the present invention will be illustrated below by means of Examples, with the aid of comparative examples.

The property values and terms used therein are defined as follows:

1. Conversion (F value)
  a. Conversion of 2,6-DMN from 2,6-DMN family:

$$2,6\text{-DMN}/2,6\text{-DMN} + 1,6\text{-DMN} + 1,5\text{-DMN} \times 100/0.45$$

[wherein 2,6-DMN, 1,6-DMN and 1,5-DMN show molar concentration (mol%) of each dimethylnaphthalene isomer].

b. Conversion of 2,7-DMN from 2,7-DMN family:

$$2,7\text{-DMN}/2,7\text{-DMN} + 1,7\text{-DMN} + 1,8\text{-DMN} \times 100/0.50$$

[wherein 2,7-DMN, 1,7-DMN and 1,8-DMN show molar concentration (mol%) of each dimethylnaphthalene isomer].

2. Selectivity (S value)
  a. Selectivity of 2,6-DMN:

$$2,6\text{-DMN}/2,6\text{-DMN} + \Delta(MN + TMN) \times 100$$

[wherein 2,6-DMN show its molar concentration (mol%) in the isomerization product; and $\Delta$(MN + TMN) shows the difference in molar concentration (mol%) of monomethylnaphthalene (MN) and trimethylnaphthalene (TMN) between that before and that after isomerization].

b. Selectivity of 2,7-DMN:

$$2,7\text{-DMN}/2,7\text{-DMN} + \Delta(MN + TMN) \times 100$$

[wherein 2,7-DMN shows its molar concentration (mol%) in the isomerization product; and $\Delta$(MN + TMN) has the same meaning as described above].

3. Catalyst life

The period of time of reaction till the above-defined F value declines to 85 %.

4. Percentage of by-product 2,7-DMN or by-product 2,6-DMN
  a. When 2,6-DMN is converted from 2,6-DMN family:

Percentage of by-product 2,7-DMN is the mol percentage of 2,7-DMN formed anew based on 2,6-DMN newly formed by the isomerization reaction.

b. When 2,7-DMN is converted from 2,6-DMN family:

Percentage of by-product 2,6-DMN is the mol percentage of 2,6-DMN formed anew based on 2,7-DMN newly formed by the isomerization reaction.

5. 1,5-DMN content $$1,5\text{-DMN}/2,6\text{-DMN} + 1,6\text{-DMN} + 1,5\text{-DMN} \times 100/0.07$$

[wherein 2,6-DMN, 1,6-DMN and 1,5-DMN each show the concentration (mol%) of each isomer in the isomerization reaction product].

6. Amount isomerized (P value)

This value indicates the amount in kilograms of dimethylnaphthalene that could be treated per kilogram of catalyst before the above-defined F value fell to below 85 %. The greater the P value, the higher the productivity per unit weight of catalyst.

7. Heavy ends (HE)

This denotes a by-product having a boiling point higher than TMN and consists principally of a compound of 24 carbon atoms (dimethylnaphthalene dimer), which can be readily isolated from DMN and TMN by distillation.

EXAMPLE 1

A stainless steel reaction cylinder having a diameter of 10 mm and a length of 3,000 mm was charged with 50 g of a mixed catalyst consisting of 90 % by weight of hydrogen type mordenite (95 % hydrogen-form) and 10 % by weight of bentonite (place of origin: Gumma Pref. Japan) and of a size about 3 mm in diameter and about 7 mm in length. Then the cylinder was heated at 300° C. While heating the cylinder at this temperature, 1,5-dimethylnaphthalene was fed at a rate of 100 g/hr. The reaction was carried out in the liquid phase under a pressure of 3.5 kg/cm² gauge, and the reaction product was collected at the cooled top of the cylinder.

The reaction was continued for 30 days, and during this period the reaction temperature was raised 10° C. at every 10-day interval.

The average conversion, selectivity, percentage of by-product 2,7-DMN and 1,5-DMN content were calculated. The results were as follows:

TABLE 1

| | |
|---|---|
| Conversion | 95.8% |
| Selectivity | 98.4% |
| Percentage of by-product 2,7-DMN | 0.2% |
| 1,5-DMN content | 250.5% |
| HE | 0.7% by weight |

COMPARATIVE EXAMPLE 1

This experiment illustrates what happens when the reaction of dimethylnaphthalene is carried out in the gaseous phase.

The same reaction cylinder as that used in Example 1 was packed with an equal amount of the same catalyst as that of Example 1, following which the cylinder was heated at 300°C.

1,5-DMN was fed from the top of the foregoing cylinder at the rate of 100 g/hr and reacted in the gaseous phase under normal atmospheric pressure. The reaction product was cooled at the bottom of the reaction cylinder and collected.

The reaction was conducted for three days, and the reaction temperature, which was 300° C. at the outset, was raised at the rate of 10° C. every 6 hours.

The average conversion, selectivity, 2,7-DMN content, catalyst life and P value were determined with the following results.

| | |
|---|---|
| Conversion | 75.0% |
| Selectivity | 94.0% |
| Percentage of by-product 2,7-DMN | 0.2% |
| 1,5-DMN content | 470.1% |
| Catalyst life | 36 hours |
| P value | 72 |

EXAMPLES 2–17 AND COMPARATIVE EXAMPLES 2–8

The procedure of Example 1 was followed to isomerize 1,5-dimethylnaphthalene, except that a catalyst having the composition shown in the following Table 2 was used. The results are shown in Table 2.

In the table, the symbols H, Na, Mg, Al and Be in the column entitled "Mordenite component Form" stand for hydrogen form, sodium form, magnesium form, aluminum form and beryllium form, respectively. In the column entitled "Promoter component Pretreatment," acid treatment means leaching with hydrochloric acid, and alkali treatment means leaching with sodium hydroxide.

Table 2

| | Catalyst composition | | | | | | | | | | | |
|---|---|---|---|---|---|---|---|---|---|---|---|---|
| | Mordenite component (wt.%) | Promoter component (wt.%) | Mordenite component Form | Promoter component Type | Place of origin | Pretreatment | Conversion (%) | Selectivity (%) | Percentage of by-product 2,7-DMN (%) | 1,5-DMN content (%) | HE (% by weight) | Catalyst life (days) | P value |
| Comp. Ex. 2 | 100 | 0 | H 95% Na 5% | — | — | — | 89.1 | 98.5 | 0.4 | 305.7 | 1.3 | 11 | 528 |
| Ex. 2 | 80 | 20 | H 95% Na 5% | bentonite | Gumma, Japan | none | 96.5 | 98.9 | 0.2 | 164.2 | 0.8 | 25 | 1,200 |
| Comp. Ex. 3 | 55 | 45 | H 95% Na 5% | do. | do. | do. | 38.4 | 99.0 | 0.0 | 682.0 | 1.2 | 8 | 384 |
| Comp. Ex. 4 | 55 | 45 a 5% | H 95% Na 5% | fuller's earth | Niigata, Japan | do. | 39.1 | 98.8 | 0.0 | 680.0 | 1.3 | 8 | 375 |
| Ex. 3 | 90 | 10 | H 95% Na 5% | do. | do. | do. | 94.9 | 98.8 | 0.2 | 236.9 | 0.9 | 24 | 1152 |
| Comp. Ex. 5 | 98 | 2 | H 70% Na 30% | bentonite | Gumma, Japan | do. | 51.2 | 98.5 | 0.2 | 450.8 | 1.2 | 11 | 528 |
| Comp. Ex. 6 | 98 | 2 | H 70% Na 30% | fuller's earth | Niigata, Japan | do. | 50.7 | 99.0 | 0.2 | 455.0 | 1.2 | 11 | 528 |
| Ex. 4 | 90 | 10 | H 99% Na 1% | bentonite | Gumma, Japan | do. | 95.9 | 98.8 | 0.2 | 220.0 | 0.7 | 23 | 1105 |
| Ex. 5 | 90 | 10 | H 99% Na 1% | fuller's earth | Niigata, Japan | do. | 95.8 | 98.5 | 0.2 | 215.0 | 0.8 | 23 | 1100 |
| Ex. 6 | 90 | 10 | H 95% Na 5% | do. | do. | acid treated | 94.8 | 98.7 | 0.2 | 237.5 | 0.9 | 23 | 1100 |
| Ex. 7 | 90 | 10 | H 95% Na 5% | bentonite | Gumma, Japan | do. | 94.5 | 98.5 | 0.2 | 237.0 | 0.9 | 23 | 1105 |
| Ex. 8 | 90 | 10 | H 85% Al 10% Na 5% | do. | do. | none | 93.9 | 98.9 | 0.2 | 230.0 | 0.8 | 20 | 960 |
| Ex. 9 | 90 | 10 | H 85% Mg 10% Na 5% | fuller's earth | Niigata, Japan | none | 94.0 | 98.3 | 0.2 | 228.0 | 0.9 | 20 | 960 |
| Ex. 10 | 90 | 10 | H 85% Al 10% Na 5% | bentonite | Gumma, Japan | acid treated | 94.3 | 98.4 | 0.2 | 238.5 | 0.9 | 22 | 1070 |
| Ex. 11 | 90 | 10 | H 85% Be 10% Na 5% | fuller's earth | Niigata, Japan | do. | 94.2 | 98.8 | 0.2 | 238.6 | 0.9 | 23 | 1100 |
| Comp. Ex. 7 | 55 | 45 | H 95% Na 5% | do. | do. | do. | 38.9 | 98.5 | 0.0 | 685.0 | 1.3 | 8 | 377 |
| Comp. Ex. 8 | 55 | 45 | H 95% Na 5% | bentonite | Gumma, Japan | do. | 39.2 | 97.9 | 0.0 | 678.0 | 1.3 | 8 | 369 |
| Ex. 12 | 90 | 10 | H 95% Na 5% | fuller's earth | Niigata, Japan | alkali-treated | 94.1 | 98.3 | 0.2 | 241.0 | 0.7 | 23 | 1105 |
| Ex. 13 | 90 | 10 | H 95% Na 5% | bentonite | Gumma, Japan | do. | 94.3 | 98.5 | 0.2 | 241.5 | 0.8 | 23 | 1110 |
| Ex. 14 | 90 | 10 | H 95% Na 5% | do. | Wyoming, USA | none | 94.8 | 98.7 | 0.2 | 239.7 | 0.7 | 24 | 1168 |
| Ex. 15 | 90 | 10 | H 95% Na 5% | do. | Montana, USA | none | 94.7 | 98.8 | 0.2 | 237.0 | 0.8 | 24 | 1160 |
| Ex. 16 | 90 | 10 | H 95% Na 5% | fuller's earth | Florida, USA | none | 94.9 | 98.6 | 0.2 | 240.1 | 0.7 | 24 | 1150 |
| Ex. 17 | 90 | 10 | H 95% Na 5% | do. | Mississippi, USA | none | 94.9 | 98.8 | 0.2 | 235.9 | 0.8 | 24 | 1155 |

EXAMPLE 18

Twenty grams of the same catalyst as that used in Example 1 was packed in the same reaction cylinder as that of Example 1. The reaction cylinder was then heated at 305° C., and a starting material of a composition shown in Table 3 was introduced at the rate of 30 g/hr while carrying out the reaction at a pressure of 3.5 kg/cm² gauge. The reaction was carried out for 20 days and, in the meanwhile, the temperature was raised every 10 days at the rate of 10° C.

The isomerized product was dissolved in a 3.0-fold amount by weight of methanol and cooled at 5° C. to crystallize and isolate 2,6-DMN. On the other hand, methanol was driven off from the resulting filtrate followed by distillation to eliminate the early fractions boiling up to 260° C. and the fractions boiling subsequent to 265° C. To the resulting key component was then added 1,5-DMN to obtain a material whose composition was adjusted such that the contents of methylnaphthalene and trimethylnaphthalene were both below 4 % and in which the ratio of 1,5-DMN to 1,6-DMN was nearly equal. This was used as the starting material, and the reaction was repeated using a regenerated catalyst. The results obtained when the starting material was recycled three times by operating in this manner are shown in the following table.

In each of the three instances the ratio of 2,7-DMN to 2,6-DMN was less than 0.5 %.

The results of the isomerization reactions are shown in Table 3 below.

The reaction was continued for 30 days, and during this period the reaction temperature was raised 10° C. at every 7-day interval.

The average conversion, selectivity, and percentage of by-product 2,6-DMN were calculated. The results were as follows:

| | |
|---|---|
| Conversion | 98.1% |
| Selectivity | 98.6% |
| Percentage of by-product | |
| 2,6-DMN | 0.2% |
| HE | 0.7% by weight |
| Catalyst life | 25 days |
| P value | 1296 |

COMPARATIVE EXAMPLE 9

This experiments illustrates what happens when the reaction of dimethylnaphthalene is carried out in the gaseous phase.

The same reaction cylinder as that used in Example 19 was packed with an equal amount of the same catalyst as that of Example 19, following which the cylinder was heated at 300° C.

1,7-DMN was fed from the top of the foregoing cylinder at the rate of 100 g/hr and reacted in the gaseous phase under normal atmospheric pressure. The reaction product was cooled and collected at the bottom of the reaction cylinder.

Table 3

| | First run | | Second run | | Third run | |
|---|---|---|---|---|---|---|
| | Starting material | Product | Starting material | Product | Starting material | Product |
| 2,6-DMN(mol%) | 9.7 | 40.4 | 7.5 | 41.2 | 9.1 | 40.9 |
| 1,6-DMN(mol%) | 42.0 | 38.6 | 40.3 | 38.6 | 41.8 | 38.7 |
| 1,5-DMN(mol%) | 42.4 | 13.4 | 46.4 | 12.5 | 42.9 | 12.6 |
| 2,7-DMN(mol%) | 0.0 | 0.2 | 0.2 | 0.3 | 0.2 | 0.3 |
| Other DMNs (mol%) | 0.1 | 0.2 | 0.3 | 0.4 | 0.4 | 0.5 |
| MN+TMN(mol%) | 5.8 | 6.8 | 5.3 | 6.6 | 5.6 | 6.6 |
| HE (% by weight) | 0.0 | 0.7 | 0.0 | 0.8 | 0.0 | 0.8 |
| Conversion(%) | | 97.2 | | 99.2 | | 98.6 |
| Selectivity(%) | | 97.6 | | 96.9 | | 97.6 |
| Percentage of by-product 2,7-DMN(%) | | 0.2 | | 0.1 | | 0.1 |
| 1,5-DMN content (%) | | 207.2 | | 193.5 | | 195.2 |

EXAMPLE 19

A stainless steel reaction cylinder having a diameter of 10 mm and a length of 3,000 mm was charged with 50 g of a mixed catalyst consisting of 90 % by weight of hydrogen type mordenite (95 % hydrogen-form) and 10 % by weight of bentonite (place of origin: Gumma Pref. Japan) and of a size about 3 mm in diameter and about 7 mm in length. Then the cylinder was heated at 330° C. While heating the cylinder at this temperature, 1,7-DMN was fed at a rate of 100 g/hr. The reaction was carried out in the liquid phase under the pressure of 3.6 kg/cm² gauge, and the reaction product was collected at the cooled top of the cylinder.

The reaction was carried out for three days, and the reaction temperature, which was 300° C. at the outset, was raised at the rate of 10° C. every 6 hours.

The average conversion, selectivity, 2,6-DMN content, catalyst life and P value were determined with the following results.

| | |
|---|---|
| Conversion | 77.2% |
| Selectivity | 94.5% |
| Percentage of by-product 2,6-DMN | 0.4% |
| Catalyst life | 39 hours |
| P value | 78 |

EXAMPLES 20-35 AND COMPARATIVE EXAMPLES 10-16

The procedure of Example 1 was followed to isomerize 1,7-DMN, except that a catalyst having the composition shown in the following Table 4 was used. The results obtained are shown in Table 4.

In the table, the symbols H, Na, Mg, Al and Be in the column entitled "Mordenite component Form" stand for hydrogen form, sodium form, magnesium form, aluminum form and beryllium form, respectively. In the column entitled "Promoter component Pretreatment," acid treatment means leaching with hydrochloric acid, and alkali treatment means leaching with sodium hydroxide.

as that employed in said example. The reaction cylinder was heated at 295° C., and a starting material of a composition shown in Table 5 was introduced into the cylinder at the rate of 30 g/hr and reacted for 20 days. In the meanwhile, the temperature was raised at the rate of 10° C. every 10 days.

The isomerized product was dissolved in a 3.0-fold amount by weight of methanol and cooled at 5° C. to crystallize and isolate 2,7-DMN. On the other hand, methanol was driven off from the resulting filtrate followed by distillation to eliminate the early fractions boiling up to 260° C. and fractions boiling subsequent to 265° C. To the resulting key component was then added 1,7-DMN to obtain a material whose composition was adjusted such that the contents of methylnaph- Table 4

| | Catalyst composition | | | | | Conversion (%) | Selectivity (%) | Percentage of by-product 2,6-DMN (%) | HE (% by weight) | Catalyst life (days) | P value |
|---|---|---|---|---|---|---|---|---|---|---|---|
| | Mordenite component (wt.%) | Promoter component (wt.%) | Mordenite component Form | Promoter component Type | Place of origin | Pretreatment | | | | | |
| Comp. Ex.10 | 100 | 0 | H 95% Na 5% | — | — | — | 89.2 | 96.8 | 0.5 | 1.1 | 11 | 528 |
| Ex.20 | 80 | 20 | H 95% Na 5% | bentonite | Gumma, Japan | none | 99.0 | 98.9 | 0.2 | 0.8 | 26 | 1250 |
| Comp. Ex.11 | 55 | 45 | H 95% Na 5% | do. | do. | do. | 41.1 | 98.5 | 0.1 | 1.2 | 9 | 432 |
| Comp. Ex.12 | 55 | 45 | H 95% Na 5% | fuller's earth | Niigata, Japan | do. | 41.2 | 98.6 | 0.1 | 1.3 | 9 | 430 |
| Ex.21 | 90 | 10 | H 95% Na 5% | do. | do. | do. | 98.2 | 98.4 | 0.2 | 0.9 | 26 | 1245 |
| Comp. Ex.13 | 98 | 2 | H 70% Na 30% | bentonite | Gumma, Japan | do. | 50.3 | 99.2 | 0.2 | 1.0 | 11 | 528 |
| Comp. Ex.14 | 98 | 2 | H 70% Na 30% | fuller's earth | Niigata, Japan | do. | 49.8 | 98.9 | 0.2 | 1.1 | 11 | 530 |
| Ex.22 | 90 | 10 | H 99% Na 1% | bentonite | Gumma, Japan | do. | 98.6 | 98.4 | 0.2 | 0.7 | 25 | 1205 |
| Ex.23 | 90 | 10 | H 99% Na 1% | fuller's earth | Niigata, Japan | do. | 98.6 | 98.3 | 0.2 | 0.8 | 25 | 1190 |
| Ex.24 | 90 | 10 | H 95% Na 5% | do. | do. | acid-treated | 97.9 | 98.6 | 0.2 | 0.9 | 25 | 1210 |
| Ex.25 | 90 | 10 | H 95% Na 5% | bentonite | Gumma, Japan | do. | 97.9 | 98.8 | 0.2 | 0.9 | 25 | 1200 |
| Ex.26 | 90 | 10 | H 85% Al 10% Na 5% | do. | do. | none | 97.5 | 98.5 | 0.2 | 0.9 | 25 | 1210 |
| Ex.27 | 90 | 10 | H 85% Mg 10% Na 5% | fuller's earth | Niigata, Japan | none | 97.3 | 98.5 | 0.2 | 0.9 | 24 | 1160 |
| Ex.28 | 90 | 10 | H 85% Al 10% Na 5% | bentonite | Gumma, Japan | acid-treated | 97.2 | 98.4 | 0.2 | 0.9 | 25 | 1215 |
| Ex.29 | 90 | 10 | H 85% Be 10% Na 5% | fuller's earth | Niigata, Japan | do. | 97.3 | 98.5 | 0.2 | 0.9 | 25 | 1210 |
| Comp. Ex.15 | 55 | 45 | H 95% Na 5% | do. | do. | do. | 40.8 | 97.9 | 0.1 | 1.2 | 9 | 420 |
| Comp. Ex.16 | 55 | 45 | H 95% Na 5% | bentonite | Gumma, Japan | do. | 41.3 | 98.0 | 0.1 | 1.2 | 9 | 425 |
| Ex.30 | 90 | 10 | H 95% Na 5% | fuller's earth | Niigata, Japan | alkali-treated | 97.5 | 98.5 | 0.2 | 0.9 | 25 | 1215 |
| Ex.31 | 90 | 10 | H 95% Na 5% | bentonite | Gumma, Japan | do. | 97.6 | 98.5 | 0.2 | 0.9 | 25 | 1215 |
| Ex.32 | 90 | 10 | H 95% Na 5% | do. | Whyoming, USA | none | 98.0 | 98.7 | 0.2 | 0.9 | 26 | 1250 |
| Ex.33 | 90 | 10 | H 95% Na 5% | do. | Montana, USA | none | 98.1 | 98.9 | 0.2 | 0.9 | 26 | 1253 |
| Ex.34 | 90 | 10 | H 95% Na 5% | fuller's earth | Florida, USA | none | 98.3 | 98.9 | 0.2 | 0.9 | 26 | 1260 |
| Ex.35 | 90 | 10 | H 95% Na 5% | do. | Mississippi, USA | none | 98.2 | 98.8 | 0.2 | 0.9 | 26 | 1255 |

EXAMPLE 36

Fifty g of catalyst identical to that used in Example 19 was packed in a reaction cylinder of the same type thalene and trimethylnaphthalene were both below 4 % and the content of 1,7-DMN was about five times that of 2,7-DMN. This was then used as the starting material, and the reaction was repeated using a regenerated catalyst. The results obtained when the starting material was recycled three times by operating in this manner are shown in the following table. In each of the three instances the ratio of 2,6-DMN to 2,7-DMN was less than 0.5 %. The results of the isomerization reactions are shown in Table 5, below.

Table 5

|  | First run | | Second run | | Third run | |
| --- | --- | --- | --- | --- | --- | --- |
|  | Starting material | Product | Starting material | Product | Starting material | Product |
| 2,7-DMN(mol%) | 11.0 | 49.3 | 10.5 | 48.2 | 9.7 | 49.9 |
| 1,7-DMN(mol%) | 83.0 | 43.0 | 84.9 | 45.4 | 85.8 | 43.9 |
| 1,8-DMN(mol%) | 0.1 | 0.0 | 0.1 | 0.0 | 0.0 | 0.0 |
| 2,6-DMN(mol%) | 0.1 | 0.2 | 0.1 | 0.2 | 0.1 | 0.2 |
| Other DMNs (mol%) | 0.1 | 0.2 | 0.1 | 0.2 | 0.2 | 0.3 |
| MN+TMN(mol%) | 5.7 | 6.9 | 4.3 | 5.6 | 4.2 | 5.3 |
| HE (% by weight) | 0.0 | 0.8 | 0.0 | 0.7 | 0.0 | 0.8 |
| Conversion(%) |  | 98.9 |  | 95.4 |  | 98.5 |
| Selectivity(%) |  | 98.2 |  | 97.4 |  | 97.8 |
| Percentage of by-product 2,6-DMN(%) |  | 0.2 |  | 0.1 |  | 0.1 |

COMPARATIVE EXAMPLES 17–18

A stainless steel reaction cylinder having a diameter of 10 mm and a length of 3,000 mm was charged with 50 g of mixed catalyst consisting of 90 % by weight of hydrogen type mordenite (95 % hydrogen-form) and 10 % by weight of fuller's earth (place of origin: Niigata Pref. Japan) and of a size about 3 mm in diameter and about 7 mm in length. Then the cylinder was heated at 310° C. While heating the cylinder at this temperature, dry hydrogen heated at 300° C. was fed to the cylinder from its top at a rate of 0.3 l/min. (volume as calculated at room temperature under atmospheric pressure), and at the same time 1,5-DMN (Comparative example 16) or 1,7-DMN(Comparative example 17) was fed at a rate of 20 g/hr (SV = 0.4). The reaction was carried out under atmospheric pressure, and the reaction product was collected at the cooled bottom of the cylinder.

The reaction was continued for 5 days, and then the average conversion, selectivity, percentage of by-product 2,7-DMN or 2,6-DMN, and 1,5-DMN content were calculated. The results were as follows:

Table 6

|  | Comparative example 16 | Comparative example 17 |
| --- | --- | --- |
| Conversion | 93.7% | 93.6% |
| Selectivity | 96.8% | 95.1% |
| Percentage of by-product 2,7-DMN or 2,6-DMN | 0.2% | 0.2% |
| 1,5-DMN content | 221.4% | — |
| Catalyst life | 88 hrs. | 91 hrs. |
| P value | 35 | 36 |

What we claim is:

1. In the process for obtaining a 2,6-dimethylnaphthalene-rich or 2,7-dimethylnaphthalene-rich product by carrying out the liquid phase catalytic intramolecular rearrangement, respectively, of dimethylnaphthalenes consisting of the 2,6-dimethylnaphthalene family or the 2,7-dimethylnaphthalene family whose content of the 2,6-dimethylnaphthalene or the 2,7-dimethylnaphthalene is less than its thermodynamic equilibrium concentration, wherein said rearrangement reaction is carried out at a temperature ranging from 260° to 500° C. in the presence of a mordenite catalyst; the improvement comprising using as the starting material that consisting of dimethylnaphthalene whose content of the dimethylnaphthalene family is at least 60 % by weight and not containing in excess of 10 mol% of trimethylnaphthalene, and carrying out said rearrangement reaction in the presence of a mixed catalyst consisting of
   a. 70–95 % by weight of a hydrogen form of mordenite in which above 80 % by weight of the metal cations are replaced with hydrogen ions, and
   b. 30–5 % by weight of a promoter selected from the group consisting of bentonite and fuller's earth.

2. The process according to claim 1 which comprises conveying the product flow formed by said catalytic intramolecular rearrangement to a 2,6-dimethylnaphthalene or 2,7-dimethylnaphthalene separating zone where 2,6-dimethylnaphthalene or 2,7-dimethylnaphthalene is isolated and collected, and the remaianing flow is recycled to said catalytic intramolecular rearrangement zone for reuse, with the provision that before the content of trimethylnaphthalene accumulating in the recycle system reaches an amount in excess of 10 mol% of the starting dimethylnaphthalenes said accumulated trimethylnaphthalene is eliminated externally of the system at a point subsequent to said rearrangement zone and before it is recycled for reuse in said zone.

3. The process according to claim 1 wherein said hydrogen form of mordenite is one in which 100–80 % by weight of the metal cations are replaced with hydrogen and 0–20 % by weight are one or more classes of cations selected from the group consisting of Li, Na, K, Mg, Be, Ca, Sr, Ba, Zn and Al.

4. The process according to claim 1 wherein the reaction temperature ranges from 280° to 430° C.

* * * * *